(12) United States Patent
Asakura (10) Patent No.: US 7,199,299 B2
(45) Date of Patent: Apr. 3, 2007

(54) APPARATUS AND COMPUTER PROGRAM FOR DISPLAYING A MUSICAL SCORE

(75) Inventor: Tatsumi Asakura, Hamamatsu (JP)

(73) Assignee: Yamaha Corporation (JP)

( * ) Notice: Subject to any disclaimer, the term of this patent is extended or adjusted under 35 U.S.C. 154(b) by 336 days.

(21) Appl. No.: 10/839,078

(22) Filed: May 5, 2004

(65) Prior Publication Data
US 2004/0244567 A1 Dec. 9, 2004

(30) Foreign Application Priority Data
May 9, 2003 (JP) ............................. 2003-132347

(51) Int. Cl.
G09B 15/00 (2006.01)
G09B 15/02 (2006.01)
G10H 1/00 (2006.01)

(52) U.S. Cl. .................. 84/477 R; 84/609; 84/649; 84/483.1; 84/483.2

(58) Field of Classification Search .................. None
See application file for complete search history.

(56) References Cited

U.S. PATENT DOCUMENTS

| | | | |
|---|---|---|---|
| 5,506,370 A | 4/1996 | Nakai et al. ................. 84/637 |
| 5,926,825 A | 7/1999 | Shirakawa .................. 707/521 |
| 6,137,041 A * | 10/2000 | Nakano ...................... 84/470 R |
| 6,235,979 B1 | 5/2001 | Yanase ......................... 84/477 |
| 6,380,471 B2 * | 4/2002 | Matsumoto ............... 84/477 R |
| 6,459,029 B2 * | 10/2002 | Uehara ...................... 84/477 R |
| 6,538,188 B2 | 3/2003 | Kondo ......................... 84/477 |
| 6,582,235 B1 | 6/2003 | Tsai et al. ................... 434/307 |
| 2001/0023633 A1 * | 9/2001 | Matsumoto .................. 84/478 |
| 2001/0054347 A1 * | 12/2001 | Uehara ...................... 84/477 R |
| 2003/0150317 A1 * | 8/2003 | Hamilton .................. 84/477 R |
| 2003/0192424 A1 | 10/2003 | Koike ......................... 84/477 |

FOREIGN PATENT DOCUMENTS

JP 2001-154665 A 6/2001

OTHER PUBLICATIONS

Relevant portion of European Search Report of corresponding European Application 04101695.7-2221, Feb. 28, 2005.

* cited by examiner

Primary Examiner—Marlon Fletcher
(74) Attorney, Agent, or Firm—Rossi, Kimms & McDowell LLP

(57) ABSTRACT

An electronic musical instrument displays a musical score including lyric character strings on a displayer 21, using music data stored in a storage device 43, by program-processing by a computer main unit 42. The music data includes a series of data representative of a lyric character string separated by break of lyrics, word, or segment of a sentence, the series of data stored in associated relation with data representative of a timing indicative of progression of a musical piece. The computer main unit 42 displays, on the displayer 21, a lyric character string which is not provided with enough display space in a display style different from a display style used for a lyric character string provided with enough display space. For example, part or the whole of characters of either of adjacent overlapping character strings is omitted, with a mark representative of being omitted attached. Alternatively, part or the whole of a preceding character string is displayed in a reduced size or in rows. As a result, on displaying character strings for a musical piece in associated relation with a musical score, even in cases where there is not enough space to display the character strings, the character strings can be displayed appropriately.

18 Claims, 7 Drawing Sheets

APPARATUS AND COMPUTER PROGRAM FOR DISPLAYING A MUSICAL SCORE

BACKGROUND OF THE INVENTION

1. Field of the Invention

The present invention relates to an apparatus and computer program for displaying a musical score, as well as displaying character strings such as lyrics and chord names in associated relation with the musical score.

2. Description of the Related Art

Conventionally, as disclosed in Japanese Laid-Open No. 2001-154665, there has been a musical score displaying apparatus which displays, on a displayer, a musical score comprising a series of notes as well as displays character strings such as lyrics and chord names in associated relation with the musical score.

However, in cases where lyric character strings are prolonged or many lyric characters or chord names are packed in narrow space, the conventional musical score displaying apparatus has a disadvantage of adjacent character strings overlapping each other. Due to the disadvantage, users are unable to read displayed characters or misread the displayed characters as different characters. In addition, overlapping characters are not visually preferable. In particular, the above-described disadvantage results in a crucial problem for a musical score displaying apparatus having a small display screen such as a case where the musical score displaying apparatus is configured by use of a displayer disposed on a panel of an electronic musical instrument.

SUMMARY OF THE INVENTION

The present invention was accomplished to solve the above-described problems, and an object thereof is to appropriately display character strings about a musical piece in associated relation with a musical score even in cases where there is not enough space to display the character strings.

In order to achieve the above-described object, a feature of the present invention lies in a musical score displaying apparatus comprising a displayer; a musical score display controller for retrieving musical score information from music data including the musical score information representative of a musical score and character string information representative of a character string and controlling the displayer to display the musical score based on the musical score information; and a character string display controller for retrieving character string information from the music data, controlling the displayer to display a character string represented by the retrieved character string information in associated relation with the displayed musical score in a first display style when there is enough space to display the character string on the displayer, and controlling the displayer to display the character string or another character string in a second display style different from the first display style so as to prevent the character string and said another character string from overlapping each other when there is not enough space to display the character string on the displayer, said another character string being a preceding character string or a subsequent character string.

Further, another feature of the present invention lies in a musical score displaying apparatus comprising a displayer; a musical score display controller for retrieving musical score information from music data including the musical score information representative of a musical score and character string information representative of a character string and controlling the displayer to display the musical score based on the musical score information; a determining portion for retrieving character string information from the music data and determining whether another character string has been displayed in the area where a character string represented by the retrieved character string information is to be displayed; and a character string display controller for controlling the displayer to display the character string in associated relation with the displayed musical score in a first display style when it is not determined by the determining portion that said another character string has been displayed in the area where the character string is to be displayed, and controlling the displayer to display the character string or said another character string in a second display style different from the first display style when it is determined by the determining portion that said another character string has been displayed in the area where the character string is to be displayed.

In these cases, for example, the musical score comprises a series of notes, the character string represents at least one of a chord name and lyrics, and the character string is displayed in associated relation with the position of a note contained in the series of notes.

Furthermore, an omission mark may be displayed in stead of part or the whole of at least one of the character string and said another character string in the second display style. The character string or said another character string may be displayed in a plurality of rows in the second display style. The character size of part or the whole of at least one of the character string and said another character string may be reduced in the second display style.

The present invention configured as described above can prevent adjacent character strings from overlapping each other even in cases where there is not enough space to display the character strings, eliminating the possibility that a user may not be able to read displayed characters or may misread the displayed characters as different characters. In addition, the present invention enhances the appearance of character strings.

The present invention having the above-described feature may be configured and embodied not only as an invention of an apparatus but also as an invention of a method and a computer program.

BRIEF DESCRIPTION OF THE DRAWINGS

FIG. 6(A) is an example display of a musical score including the display of lyrics on which processing of the present invention has not been carried out, while FIG. 6(B) shows an example display of a musical score including the display of lyrics on which processing of the present invention has been carried out;

FIG. 9(A) is an example display of a musical score including the display of chord names on which processing of the present invention has not been carried out, while FIG. 9(B) shows an example display of a musical score including the display of chord names on which processing of the present invention has been carried out.

DESCRIPTION OF THE PREFERRED EMBODIMENT

Figure 1:
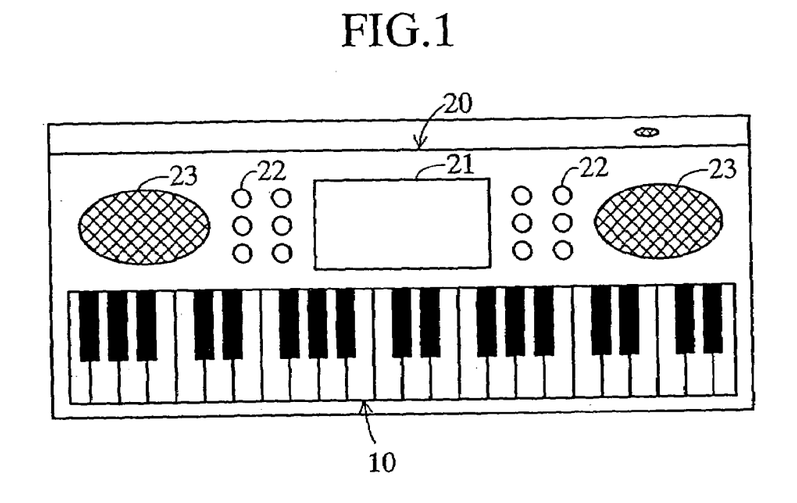
FIG. 1 is an external view of an electronic musical instrument containing a musical score displaying apparatus according to an embodiment of the present invention.
Figure 2:
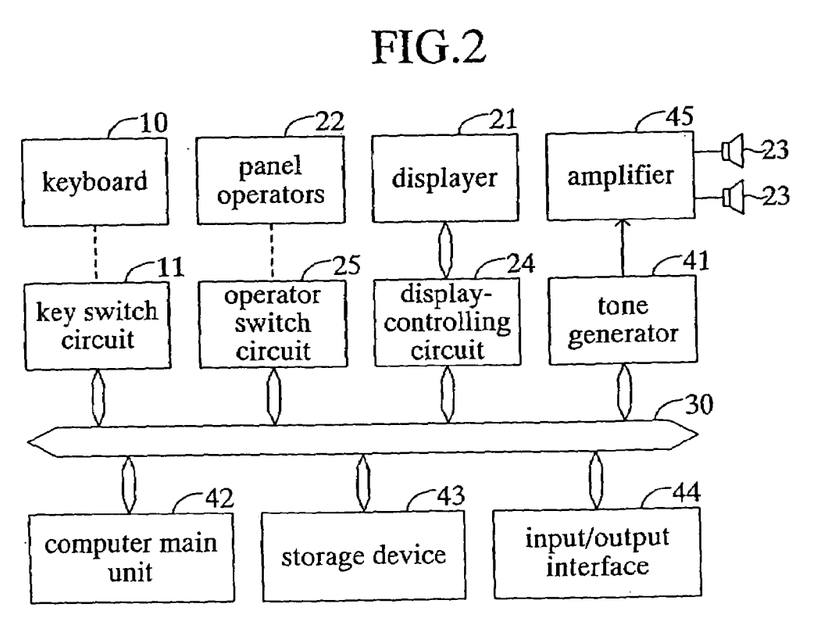
FIG. 2 is a circuit block diagram of the electronic musical instrument.

An embodiment of the present invention will now be described with reference to the drawings. FIG. 1 shows an external view of an electronic musical instrument having a musical score displaying apparatus of the present invention, while FIG. 2 is a circuit block diagram of the electronic musical instrument.

The electronic musical instrument has a keyboard 10 and operating panel 20. The keyboard 10 comprises a plurality of keys used as performance operators. The depression and release of the respective keys are detected by a plurality of key switches provided in a key switch circuit 11. Also embedded in the key switch circuit 11 is a key-touch detection circuit for detecting the strength of key-touch. The key switch circuit 11 also detects the key-touch intensity at the depression of the keys. The key switch circuit 11 is connected with a bus 30.

On the operating panel 20 there are provided a displayer 21, a plurality of panel operators 22 and a pair of speakers 23 and 23. The displayer 21, which is configured by a liquid crystal display, is used for selecting or triggering various modes or operations on the electronic musical instrument, as well as for displaying a musical score. As the displayer 21, display units other than the liquid crystal display, such as a compact cathode ray tube display, may be applicable. The display on the displayer 21 is controlled by a display-controlling circuit 24 which is connected with the bus 30. The panel operators 22 are provided for controlling operations on the electronic musical instrument. The respective operations on the panel operators 22 are detected by operator switches disposed in an operator switch circuit 25. The operator switch circuit 25 is also connected with the bus 30. The speakers 23 and 23 are provided for emitting musical tones.

Also connected to the bus 30 are a tone generator 41, computer main unit 42, storage device 43 and input/output interface circuit 44. The tone generator 41 generates tone signals in accordance with performance information and tone control information supplied through the bus 30 and outputs thus-generated tone signals. The tone signals are amplified by an amplifier 45 and output through the speakers 23 and 23.

The computer main unit 42, which comprises a CPU, timer, ROM, RAM, etc., executes various programs to control various operations on the electronic musical instrument. The storage device 43 includes various storage media such as a hard disk and flash memory with which the electronic musical instrument has previously equipped and compact disk and flexible disk applicable to the electronic musical instrument, and drive units corresponding to the above storage media, being capable of storing and reading voluminous data and programs.

Figure 3:
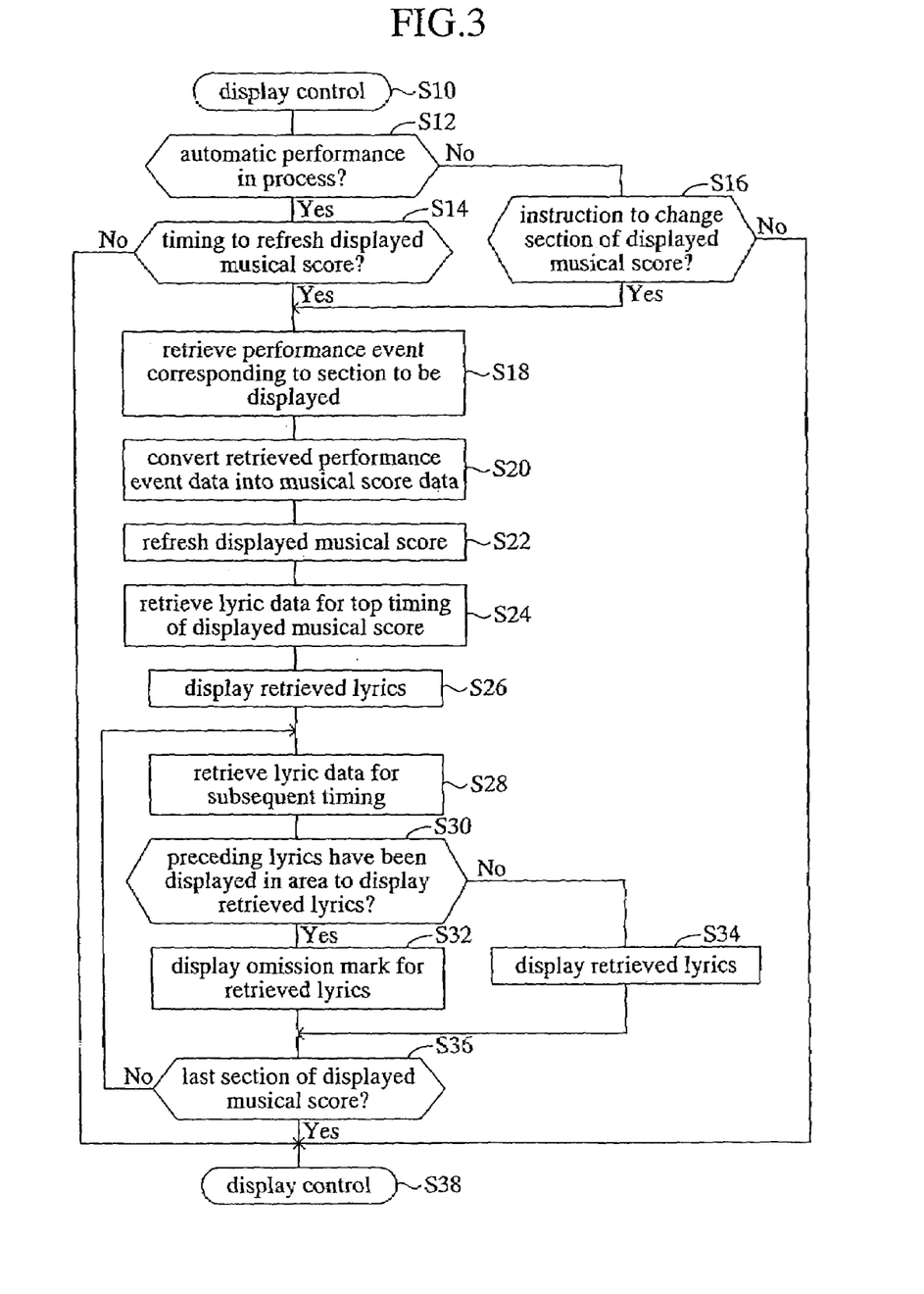
FIG. 3 is a flowchart of a display-controlling program executed on a main unit of a computer shown in FIG. 2.

In the embodiment, particularly, the hard disk or flash memory stores a display-controlling program shown in FIG. 3 and sets of music data. The display-controlling program and sets of music data are supplied from the compact disk or flexible disk to the hard disk or flash memory. Alternatively, the display-controlling program and sets of music data may be supplied from an external apparatus or communications line via the input/output interface circuit 44.

Figure 4:
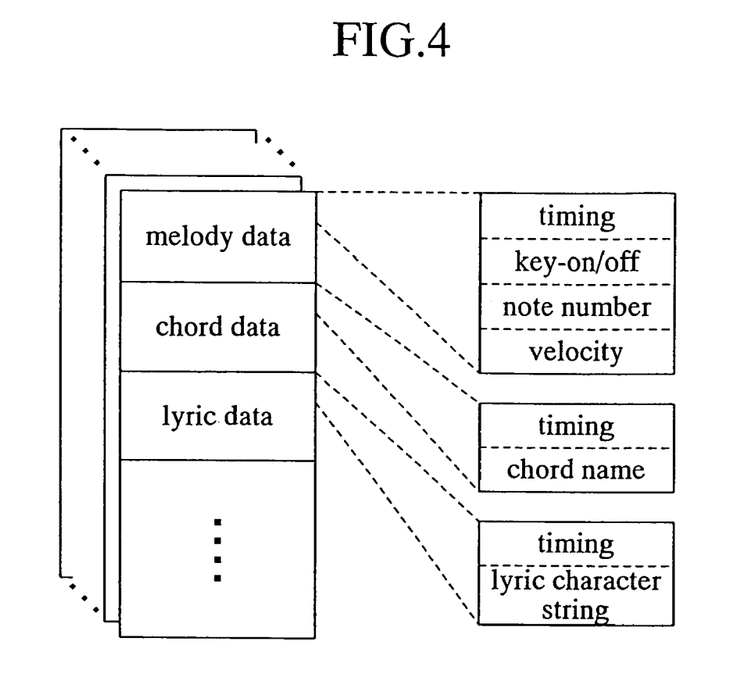
FIG. 4 is a diagram showing a format of music data.

A set of music data comprises melody data, chord data, lyric data, etc. as shown in FIG. 4. The melody data has sets of performance event data arranged in accordance with the progression of a musical piece. A set of performance event data comprises timing data, key-on (or key-off) data, note number data and velocity data. The timing data represents the timing of a performance event by bar, beat or the like counted from the start of a performance. The key-on and key-off data represents the depression of a key (the start of generating a tone) and the release of a key (the end of generating a tone), respectively. The note number data represents a depressed or released key (pitch). The velocity data represents the speed or the strength of a key-depressing (loudness of a tone signal).

The chord data comprises sets of chord event data each of which comprises timing data similar to the above-described timing data and chord name data representative of a chord name. The lyric data comprises sets of lyric event data each of which comprises timing data similar to the above-described timing data and lyric character string data representative of lyrics. The lyric character string data represents a character string separated by break of lyrics, word, or segment of a sentence.

The input/output interface circuit 44 allows the electronic musical instrument to transmit/receive data to/from an external apparatus, also allowing for data transmission/reception between the electronic musical instrument and an external communications line (e.g., the Internet).

Next explained will be the operations of the embodiment configured as described above. When power (not shown) of the electronic musical instrument is turned on by a user, or when any of the panel operators 22 is operated after power-up, the computer main unit 42 reads out various programs and data stored in the hard disk or flash memory of the storage device 43, the programs including the display-controlling program shown in FIG. 3. The computer main unit 42 then stores the read-out programs and data in the RAM to start a given program stored in the RAM.

In cases where the hard disk or flash memory does not store the various programs, the programs stored in a storage medium such as a compact disk or flexible disk are supplied to the hard disk or flash memory, or the programs are externally downloaded into the hard disk or flash memory through an external apparatus or communications line. Thus-supplied/downloaded programs are then transmitted to the RAM and started. Alternatively, as the needs arise, the hard disk, flash memory or other storage medium may keep part of the various programs and data, without transmitting to the RAM.

Here, operations for generating musical tones will be briefly explained on the basis of key-operations on the keyboard 10. When a player depresses any key on the keyboard 10, the operation of depressing the key and the strength of the key-touch at the depressing operation are detected by the key switch circuit 11. Thus-detected key-depressing operation and strength are supplied to the computer main unit 42. The computer main unit 42 then supplies performance information comprising key-on data representative of the key-depressing operation, note number data representative of the depressed key and velocity data representative of the key-touch to the tone generator 41. The tone generator 41 responds to the key-on data, generates a tone signal having a pitch (i.e., frequency) corresponding to the note number data, and output thus-generated tone signal to the amplifier 45 in the loudness corresponding to the velocity data. The amplifier 45 then outputs from the speakers 23 and 23 a musical tone corresponding to the supplied tone signal. The above-generated tone signal has a tone color selected through the panel operators 22.

On the other hand, when the depressed key is released, the release of the key is detected by the key switch circuit 11 and supplied to the computer main unit 42. The computer main unit 42 supplies key-off data representative of the key-releasing operation and note number data representative of the released key to the tone generator 41. The tone generator 41 responds to the key-off data to stop generating a tone signal corresponding to the note number data, thereby stopping a musical tone for the released key from being emitted from the speakers 23 and 23. In a manner described above, musical tones played on the keyboard 10 are emitted one after the other, resulting in a musical piece corresponding to the performance on the keyboard 10.

Next briefly explained will be an automatic performance mode using music data. In the automatic performance mode, the computer main unit 42 executes an automatic performance program which is not shown. First, in this mode, a user is prompted to select a musical piece to be automatically performed. At the selection of a musical piece, the computer main unit 42 displays on the displayer 21 titles of musical pieces of music data stored in the storage device 43 to prompt the user to select a title. Then, the music data for the selected title is read out from the storage device 43 and transmitted to the RAM. In cases where the user-selected musical piece is not stored in the storage device 43, the computer main unit 42 can retrieve it from an external apparatus or communications line via the input/output interface circuit 44.

If the user gives an instruction to start the automatic performance of the selected musical piece, the computer main unit 42 sequentially reads out, in accordance with the progression of the musical piece (i.e., in accordance with the progression of time), sets of performance event data corresponding to the progression timing of the musical piece. When a set of performance event data on key-depression is read out, the computer main unit 42 supplies performance information comprising key-on data, note number data and velocity data contained in the read-out set of performance event data to the tone generator 41. As in the above-described case, the tone generator 41 then starts generating a tone signal corresponding to the supplied performance information to emit a musical tone corresponding to the tone signal from the speakers 23 and 23. In this case, the above-generated tone signal has a tone color specified by tone color controlling data contained in the performance event data.

On the other hand, when a set of performance event data on key-release is read out, the computer main unit 42 supplies key-off data and note number data contained in the read-out set of performance event data to the tone generator 41. As in the above-described case, the tone generator 41 then stops a tone signal corresponding to the supplied performance information from being generated, stopping a musical tone corresponding to the tone signal from being emitted from the speakers 23 and 23. As described above, since sets of performance event data contained in a set of music data are automatically read out one after the other in accordance with the progression of the musical piece, thereby emitting musical tones specified by the sets of performance event data one after the other, the automatic performance of a musical piece based on the music data can be achieved.

Next explained will be the display of a musical score directly relating to the present invention. In this case as well as the case of the automatic performance mode, a set of music data whose musical score is to be displayed is transmitted to the RAM. In cases where the music data to be displayed has been already transmitted to the RAM by the execution of the automatic performance program, the transmission process is not required. After the transmission of the music data, the computer main unit 42 periodically executes the display-controlling program shown in FIG. 3 at given short time intervals. The execution of the display-controlling program is started at step S10, and at step S12 it is determined whether the electronic musical instrument is automatically performing a musical piece.

Figure 6:
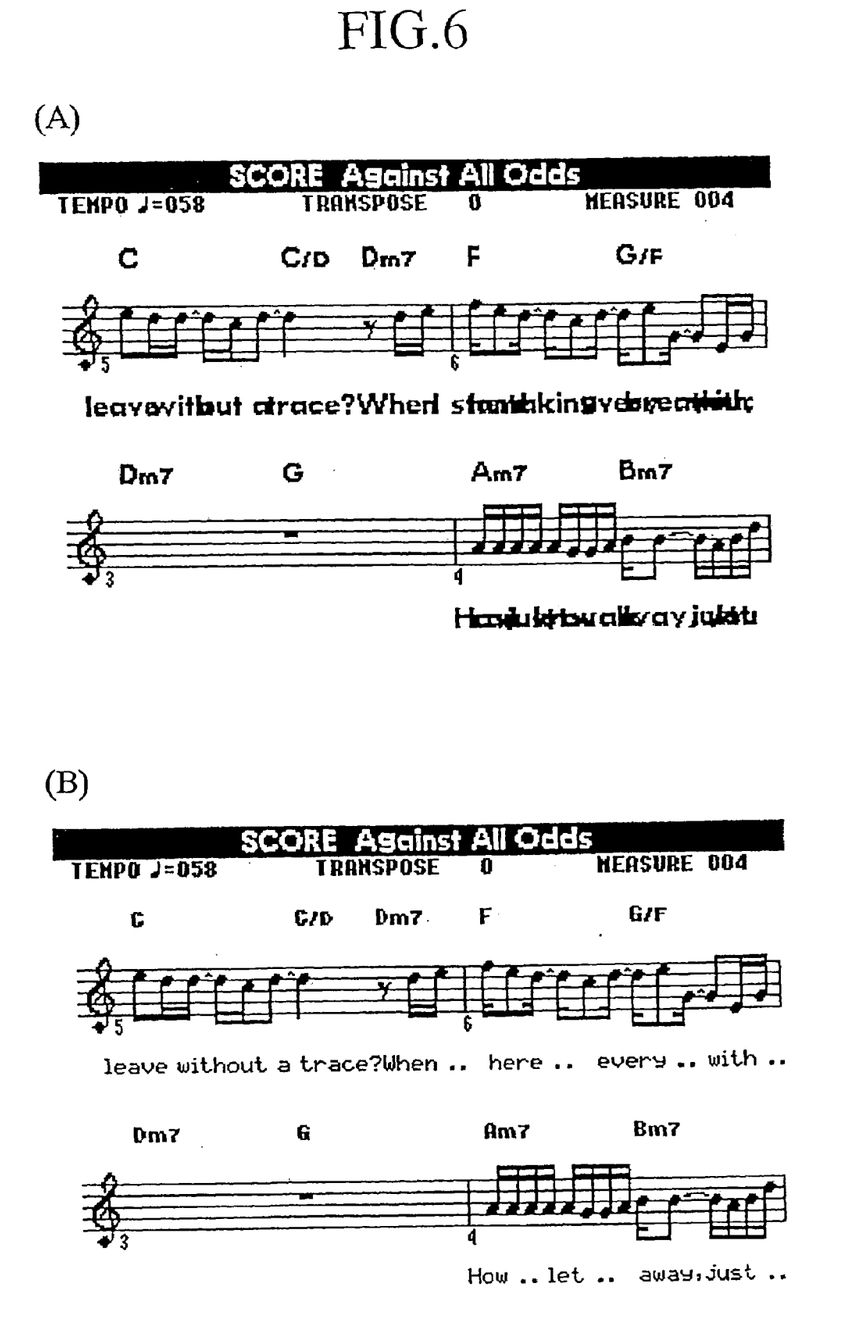

If the electronic musical instrument is currently conducting an automatic performance, the flowchart proceeds to step S14 to determine whether the current progress timing of the automatic performance corresponds with the timing for refreshing the display of a musical score. For example, if the timing for refreshing the display of a musical score has been previously provided for each bar, the timing indicative of the end of a bar is regarded as the timing to refresh the display of a musical score. If the timing for refreshing the display of a musical score has been previously provided for every given number of bars which is two or more, the timing indicative of the end of the given number of bars is regarded as the timing to refresh the display of a musical score. More specifically, as shown in FIG. 6, in a case of a musical score having two rows each comprising two bars with the refresh timing provided for every two bars, the rows are refreshed (i.e., scrolled) at every end of two bars.

If the current progress timing of the automatic performance does not correspond with the timing for refreshing the display of a musical score, the flowchart proceeds to step S38 and the computer main unit 42 finishes the display-controlling program. On the other hand, if the current progress timing of the automatic performance corresponds with the timing for refreshing the display of a musical score, the computer main unit 42 executes steps located downward from step S18.

If "No" is given at step S12, that is, if it is determined that the electronic musical instrument is not currently conducting an automatic performance, the flowchart proceeds to step S16 to determine whether the user has given an instruction to change the section of displayed musical score. The instruction for changing the section of displayed musical score is made on the basis of the operation of the panel operators 22. This instruction is given, for example, when the user desires to change displayed sections of a musical score while looking at the musical score to play a musical piece. If it is determined that the instruction is not given, the flowchart proceeds to step S38 and the computer main unit 42 finishes the display-controlling program. On the other hand, if the instruction is given, the computer main unit 42 executes steps located downward from step S18.

At step S18 the computer main unit 42 retrieves, from the music data stored in the RAM, sets of performance event data corresponding to the sections of a musical score which are required to be displayed at the step S14 or S16. In this case, if part of the performance event data needs changing, the computer main unit 42 may retrieve newly required performance event data from the music data in the RAM and dispose of unnecessary performance event data. Then at step S20 the computer main unit 42 converts thus-retrieved performance event data into musical score data comprising a plurality of notes. At step S22 the computer main unit 42 then controls the displayer 21 to refresh the musical score displayed on the displayer 21 by use of the converted musical score data. As a result, a series of notes are displayed on a staff.

Next, at step S24 the computer main unit 42 retrieves, from the music data in the RAM, data on a lyric character string corresponding to the top timing of the musical score displayed on the displayer 21. The retrieved data on the lyric character string is the data representative of a lyric character string separated by break of lyrics, word, or segment of a sentence stored in associated relation with a set of timing data. In this case as well, if the computer main unit 42 has already retrieved the data on the lyric character string, the computer main unit 42 does not need to retrieve the data again. At step S26 the lyric character string represented by thus-retrieved data on lyric character string is displayed on the displayer 21, the lyric character string being placed from the position corresponding to the top timing of the displayed musical score toward the rear.

After step S26, the computer main unit 42 iterates a loop comprising steps S28 through S36 until the computer main unit 42 retrieves data on a lyric character string corresponding to the last position of the musical score displayed on the displayer 21. At step S28 the computer main unit 42 retrieves from the music data stored in the RAM, data on a lyric character string representative of a lyric character string subsequent to the previously displayed lyric character string. Then at step S30 it is determined whether part of the preceding lyric character string has been already displayed in the area where the lyric character string represented by the newly retrieved lyric character string data is to be displayed. The area is a display area for displaying a lyric character string which relates to notes corresponding to the lyric character string represented by the newly retrieved lyric character string data. This determination may be made on the basis of display-controlling data for controlling the display on the displayer 21, however, the determination may be also made on the basis of the interval obtained from timing data and the number of characters contained in a lyric character string.

If part of the preceding lyric characters has been already displayed in the above-described area, the flowchart proceeds to step S32. At step S32, without displaying the lyric characters represented by the above-retrieved lyric character string data, an omission mark (e.g., "••") indicating that the display of the lyric characters is omitted is displayed at the rear of the preceding character string. On the other hand, if not, the flowchart proceeds to step S34 where the lyric characters represented by the above-retrieved lyric character string data are not omitted but displayed from the corresponding position toward the rear. When the computer main unit 42 retrieves data on a lyric character string corresponding to the last section of the musical score displayed on the displayer 21, the computer main unit 42 determines "Yes" at step S36 to terminate the display-controlling program at step S38.

Figure 5:
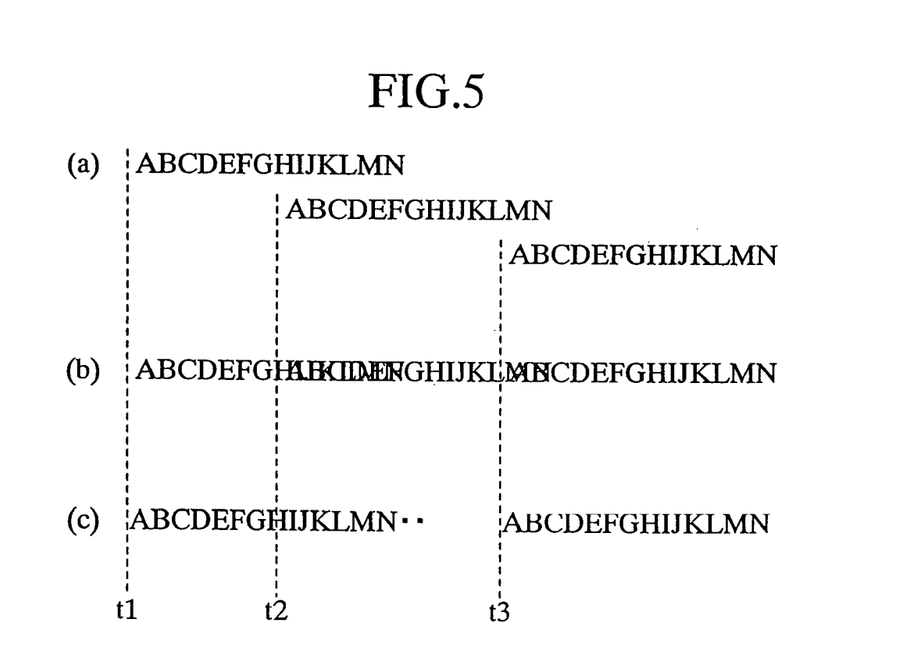
FIG. 5 is an explanatory drawing which shows states in which character strings of lyrics are displayed by the display-controlling program shown in FIG. 3.

Next explained will be lyric character strings to be displayed on the displayer 21 by the loop process comprising steps S28 through S36, showing examples. Assume that lyric data contains sets of lyric character string data each corresponding to timings t1, t2 and t3 respectively, and each representing a lyric character string of "ABCDEF-GHIJKLMN", as shown in FIG. 5(a). In this case, if the above-described loop process is not performed, respective lyric character strings overlap each other in part thereof, resulting in illegible lyric character strings as shown in FIG. 5(b). However, by the above-described loop process, since part of a lyric character string corresponding to the timing t1, that is, "IJKLMN" has been already displayed on an area where a lyric character string corresponding to the timing t2 is to be displayed, the display of the lyric character string corresponding to the timing t2 is omitted, with an omission mark "••" displayed at the rear of the above-described "IJKLMN". In addition, since on an area to display a lyric character string corresponding to the timing t3 there has not been displayed any lyric character string yet, a lyric character string "ABCDEFGHIJKLMN" is displayed from the position of the timing t3 toward the rear. FIG. 6(A) shows a specific example of displaying a musical score corresponding to FIG. 5(b), while FIG. 6(B) showing a specific example of displaying a musical score corresponding to FIG. 5(c).

As apparent from above-described operational descriptions, in cases where adjacent lyric character strings separated by a given unit overlap each other, the above embodiment is designed to omit the entire characters of a subsequent lyric character string, as well as display an omission mark "••" representative of being omitted. As a result, the above embodiment prevents adjacent lyric character strings from overlapping even in insufficient lateral space for displaying the lyric character strings, eliminating unreadable display of lyric character strings. The above embodiment also prevents users from misreading overlapping characters. In addition, the above embodiment enhances the appearance of the displayed lyric character strings. In particular, the above embodiment is very effective for languages prone to have prolonged lyric character strings such as English, French and German.

In carrying out the present invention, it will be understood that the present invention is not limited to the above-described embodiment and its variations, but various modifications may be made without departing from the spirit and scope of the invention.

Figure 7:
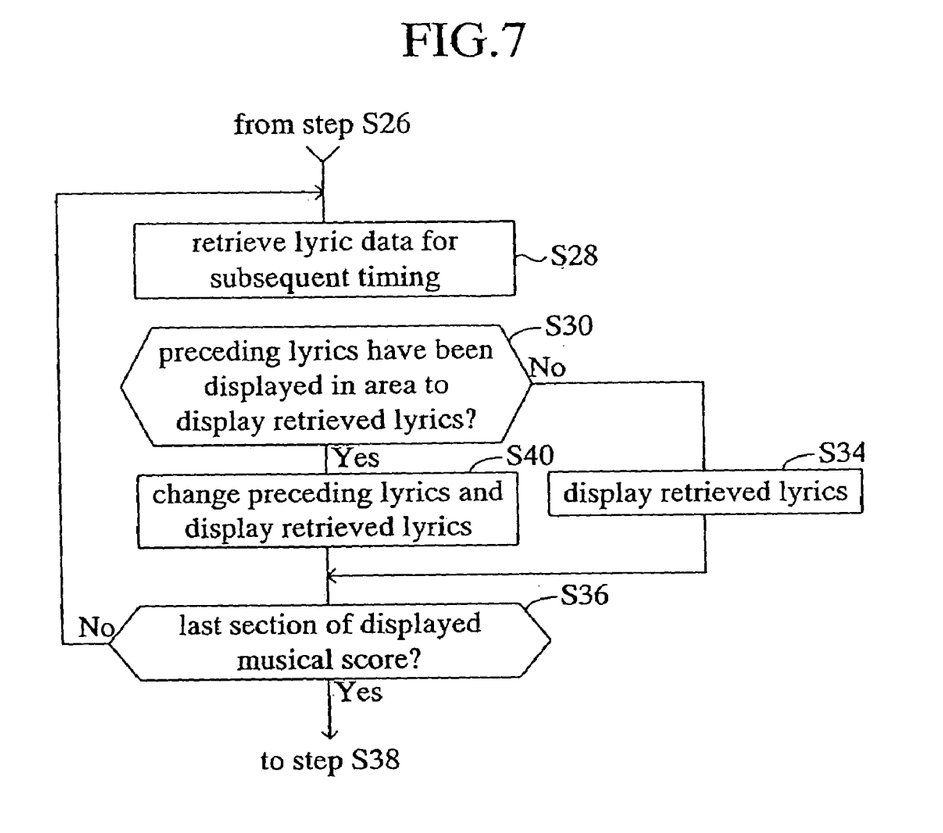
FIG. 7 is a flowchart showing the modified portion of a modified program which is obtained by partly modifying the display-controlling program shown in FIG. 3.

For example, although the above embodiment is designed to change the display style of a subsequent lyric character string in cases where adjacent lyric character strings overlap, the above embodiment may be adapted to change the display style of a preceding lyric character string. In this case, for example, the computer main unit 42 may be adapted to execute the display-controlling program in which the process of step S32 in FIG. 3 is substituted with a process shown in step S40 in FIG. 7. The process of step S40 changes the display style of a preceding lyric character string, preventing the overflow of the preceding lyric character string into the display area of a subsequent lyric character string.

Figure 8:
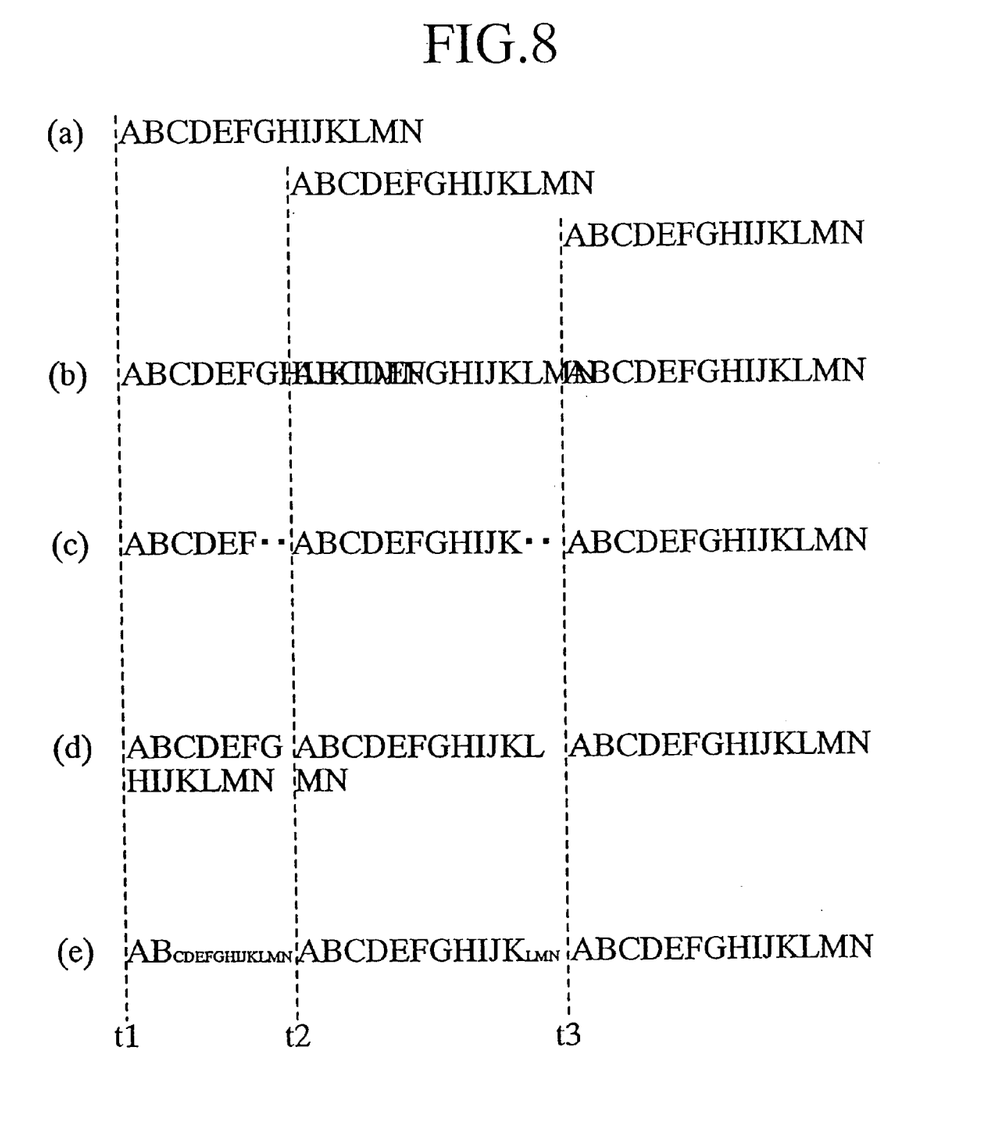
FIG. 8 is an explanatory drawing which shows states in which character strings of lyrics are displayed by the modified program shown in FIG. 7.

As shown in FIG. 8(c), for example, the display style may be adapted to omit the second half of a preceding lyric character string and display an omission mark "••". Further, as shown in FIG. 8(d), the display style may be modified to display the preceding lyric character string in two rows. The preceding lyric character string may be also displayed in more than two rows. As shown in FIG. 8(e), in addition, the character size of part or the whole of the preceding lyric character string may be reduced comparing with the character size of the lyric character string displayed under the condition that has enough space for displaying the preceding lyric character string. Further, the preceding lyric character string may be displayed in more than one row under the condition of reducing the character size of part or the whole of the preceding lyric character string. As in the case of FIG. 5(a), FIG. 8(a) illustrates respective lyric character strings at the timings t1, t2 and t3. As in the case of FIG. 5(b), FIG. 8(b) illustrates a state where lyric character strings overlap each other without the process of the present invention for changing the display style of lyric character strings.

The above-described modified examples prevent adjacent lyric character strings from overlapping even in insufficient lateral space for displaying the lyric character strings, eliminating unreadable display of the lyric character strings. The above examples also prevent users from misreading overlapping characters. In addition, the above examples enhance the appearance of the displayed lyric character strings.

Further, the above-described effect can be obtained by modifying the above-described embodiment and its modified examples as follows. In the above embodiment and its modified examples, when part or the whole of a lyric character string is omitted, the omission mark "••" is displayed. However, the omission mark is not limited to "••", and various marks such as "--" or "//" may be substituted. Furthermore, an omission mark may not be displayed. On omitting the display of a lyric character string, the display style may be adapted to display only the top character of a word or a few characters from the top and omit the following characters.

Although the entire characters of a subsequent string are omitted in the above embodiment, the display style may be adapted to display part of the subsequent character string, instead of omitting the entire string if there is space to display part of the character string. In this case as well, an omission mark may be either displayed or omitted. In addition, as in the cases of the above-described modified examples, the subsequent lyric character string may be displayed in two rows. The subsequent lyric character string may be also displayed in more than two rows. Alternatively, the character size of part or the whole of the subsequent lyric character string may be reduced comparing with the character size of the lyric character string displayed under the condition that has enough space for displaying the subsequent lyric character string. Further, the subsequent lyric character string may be displayed in more than one row under the condition of reducing the character size of part or the whole of the subsequent lyric character string.

Figure 9:
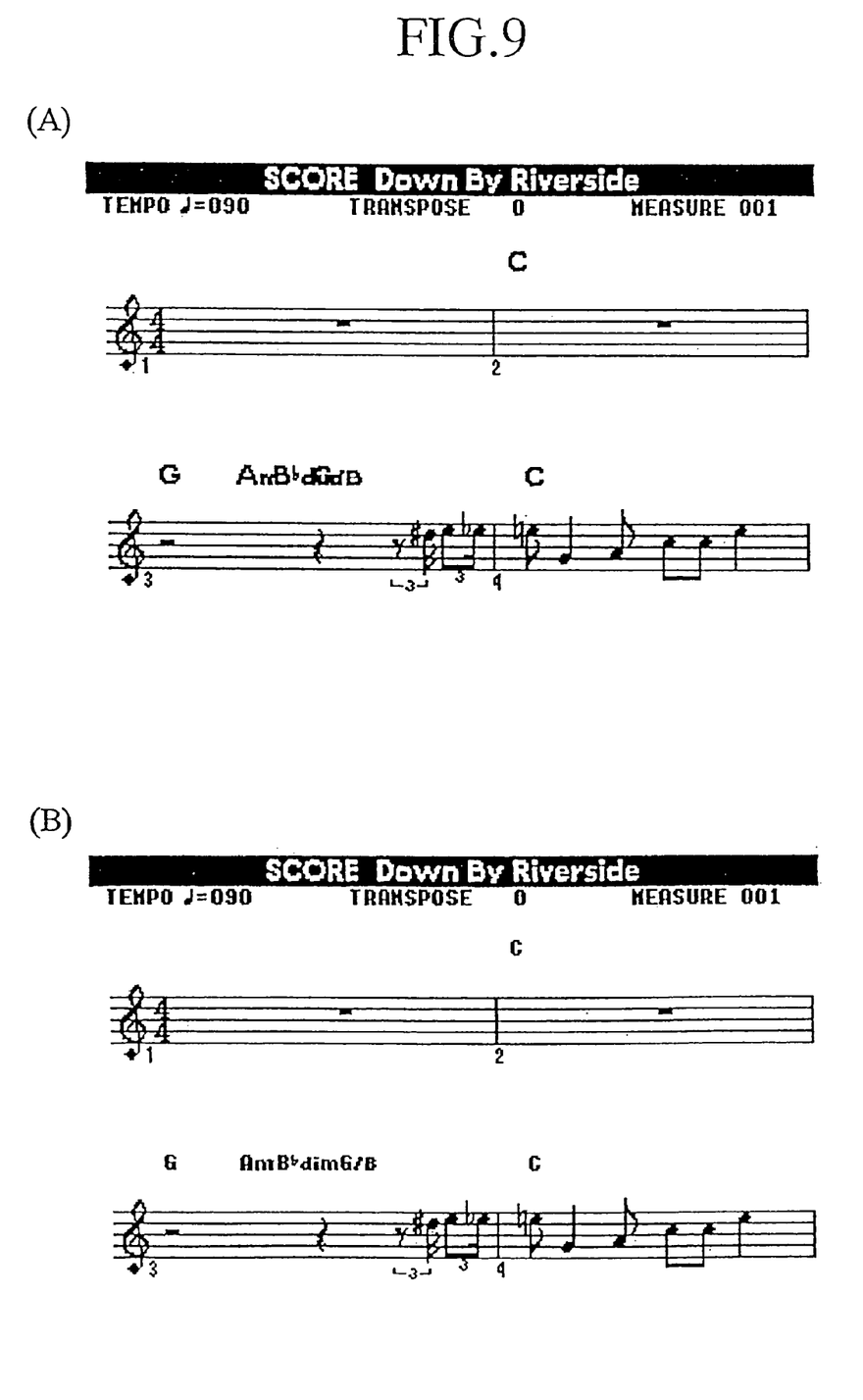

Moreover, although the above embodiment and its modified examples dealt with the overlap between adjacent lyric character strings, the processing of the present invention for changing the display style of character strings may be applicable to the display of chord names on a musical score. More specifically, the above description about the display-controlling program of the embodiment does not refer to chord data which is included in music data and contains chord name data in paired with timing data, however, when the chord data is read out to display a chord name on a musical score, there could be a case where adjacent chord names, Am and Bbdim, G/B are overlapping as shown in FIG. 9(A). In such a case, the display style may be adapted to displace one of or both of the overlapping chord names of Am and Bbdim, G/B as shown in FIG. 9(B). Alternatively, the character size of either or both of the two chord names may be reduced, or the chord names may be displayed in two rows.

The above-described display style of chord names prevents adjacent character strings of chord names from overlapping even in insufficient lateral space for displaying the character strings, eliminating unreadable display of chord names. The above display style of chord names also prevents users from misreading overlapping characters. In addition, the above display enhances the appearance of the displayed character strings. The processing of the present invention for changing the display style of character strings may be applicable not only to chord names but also to musical marks displayed on a musical score.

The above-described embodiment is designed to display a musical score comprising a series of notes on a staff by converting performance event data into musical score data by the process of step S20. When music data contains musical score data directly representing a pitch and type of a note, however, the converting process of step S20 is not required because the musical score data obtained from the music data can be directly applied to the display of a musical score on the displayer 21.

Although the above description about the embodiment does not refer to a mode in which only lyrics are displayed on the displayer 21, the above-described electronic musical instrument also has the mode in which only a series of lyric characters is displayed without a musical score. By selecting this mode, the users can reach the entire lyrics, part of which has been omitted at the execution of the display-controlling program of the above embodiment.

In addition, although the description about the above embodiment refers to an example in which the present invention is applied to an electronic musical instrument having a keyboard as performance operators, the present invention may be applicable to various musical instruments having a touch plate, push buttons or strings as performance operators. Moreover, the present invention may be applicable to musical score displaying apparatuses without performance operators such as musical score displaying apparatuses using a sequencer or personal computer.

What is claimed is:

1. A musical score displaying apparatus comprising:
   a displayer;
   a musical score display controller for retrieving musical score information from music data including the musical score information representative of a musical score and character string information representative of a character string and controlling the displayer to display the musical score based on the musical score information; and
   a character string display controller for retrieving character string information from the music data, controlling the displayer to display a character string represented by the retrieved character string information in associated relation with the displayed musical score in a first display style in a predetermined character string display space when the character string display space has enough space to display the character string on the displayer, and controlling the displayer to display the character string or another character string in a second display style different from the first display style in the predetermined character string display space so as to prevent the character string and said another character string from overlapping each other when the predetermined character string display space does not have enough space to display the character string on the displayer, said another character string being a preceding character string or a subsequent character string.

2. A musical score displaying apparatus according to claim 1, wherein:
   the musical score comprises a series of notes;
   the character string represents at least one of a chord name and lyrics; and
   the character string is displayed in associated relation with the position of a note contained in the series of notes.

3. A musical score displaying apparatus comprising:

a displayer;

a musical score display controller for retrieving musical score information from music data including the musical score information representative of a musical score and character string information representative of a character string and controlling the displayer to display the musical score based on the musical score information; and a character string display controller for retrieving character string information from the music data, controlling the displayer to display a character string represented by the retrieved character string information in associated relation with the displayed musical score in a first display style when there is enough space to display the character string on the displayer, and controlling the displayer to display the character string or another character string in a second display style different from the first display style so as to prevent the character string and said another character string from overlapping each other when there is not enough space to display the character string on the displayer, said another character string being a preceding character string or a subsequent character string, wherein an omission mark is displayed instead of part or the whole of at least one of the character string and said another character string in the second display style.

4. A musical score displaying apparatus comprising:

a displayer;

a musical score display controller for retrieving musical score information from music data including the musical score information representative of a musical score and character string information representative of a character string and controlling the displayer to display the musical score based on the musical score information; and a character string display controller for retrieving character string information from the music data, controlling the displayer to display a character string represented by the retrieved character string information in associated relation with the displayed musical score in a first display style when there is enough space to display the character string on the displayer, and controlling the displayer to display the character string or another character string in a second display style different from the first display style so as to prevent the character string and said another character string from overlapping each other when there is not enough space to display the character string on the displayer, said another character string being a preceding character string or a subsequent character string, wherein the character string or said another character string is displayed in a plurality of rows in the second display style.

5. A musical score displaying apparatus comprising:

a displayer;

a musical score display controller for retrieving musical score information from music data including the musical score information representative of a musical score and character string information representative of a character string and controlling the displayer to display the musical score based on the musical score information; and a character string display controller for retrieving character string information from the music data, controlling the displayer to display a character string represented by the retrieved character string information in associated relation with the displayed musical score in a first display style when there is enough space to display the character string on the displayer, and controlling the displayer to display the character string or another character string in a second display style different from the first display style so as to prevent the character string and said another character string from overlapping each other when there is not enough space to display the character string on the displayer, said another character string being a preceding character string or a subsequent character string, wherein the character size of part or the whole of at least one of the character string and said another character string is reduced in the second display style.

6. A musical score displaying apparatus comprising:

a displayer;

a musical score display controller for retrieving musical score information from music data including the musical score information representative of a musical score and character string information representative of a character string and controlling the displayer to display the musical score based on the musical score information;

a determining portion for retrieving character string information from the music data and determining whether another character string has been displayed in a predetermined area where a character string represented by the retrieved character string information is to be displayed; and a character string display controller for controlling the displayer to display the character string in associated relation with the displayed musical score in a first display style in the predetermined area when it is not determined by the determining portion that said another character string has been displayed in the predetermined area where the character string is to be displayed, and controlling the displayer to display the character string or said another character string in a second display style different from the first display style in the predetermined area so as to prevent the character string and said another character string from overlapping each other when it is determined by the determining portion that said another character string has been displayed in the predetermined area where the character string is to be displayed.

7. A musical score displaying apparatus according to claim 6, wherein:

the musical score comprises a series of notes;

the character string represents at least one of a chord name and lyrics; and the character string is displayed in associated relation with the position of a note contained in the series of notes.

8. A musical score displaying apparatus comprising:

a displayer;

a musical score display controller for retrieving musical score information from music data including the musical score information representative of a musical score and character string information representative of a character string and controlling the displayer to display the musical score based on the musical score information;

a determining portion for retrieving character string information from the music data and determining whether another character string has been displayed in the area where a character string represented by the retrieved character string information is to be displayed; and a character string display controller for controlling the displayer to display the character string in associated relation with the displayed musical score in a first display style when it is not determined by the determining portion that said another character string has been displayed in the area where the character string is to be displayed, and controlling the displayer to display the character string or said another character string in a second display style different from the first display style when it is determined by the determining portion that said another character string has been displayed in the area where the character string is to be displayed wherein an omission mark is displayed in stead of part or the whole of at least one of the character string and said another character string in the second display style, wherein an omission mark is displayed instead of part or the whole of at least one of the character string and said another character string in the second display style.

9. A musical score displaying apparatus comprising:

a displayer;

a musical score display controller for retrieving musical score information from music data including the musical score information representative of a musical score and character string information representative of a character string and controlling the displayer to display the musical score based on the musical score information;

a determining portion for retrieving character string information from the music data and determining whether another character string has been displayed in the area where a character string represented by the retrieved character string information is to be displayed; and a character string display controller for controlling the displayer to display the character string in associated relation with the displayed musical score in a first display style when it is not determined by the determining portion that said another character string has been displayed in the area where the character string is to be displayed, and controlling the displayer to display the character string or said another character string in a second display style different from the first display style when it is determined by the determining portion that said another character string has been displayed in the area where the character string is to be displayed wherein an omission mark is displayed in stead of part or the whole of at least one of the character string and said another character string in the second display style, wherein the character string or said another character string is displayed in a plurality of rows in the second display style.

10. A musical score displaying apparatus comprising:

a displayer;

a musical score display controller for retrieving musical score information from music data including the musical score information representative of a musical score and character string information representative of a character string and controlling the displayer to display the musical score based on the musical score information;

a determining portion for retrieving character string information from the music data and determining whether another character string has been displayed in the area where a character string represented by the retrieved character string information is to be displayed; and a character string display controller for controlling the displayer to display the character string in associated relation with the displayed musical score in a first display style when it is not determined by the determining portion that said another character string has been displayed in the area where the character string is to be displayed, and controlling the displayer to display the character string or said another character string in a second display style different from the first display style when it is determined by the determining portion that said another character string has been displayed in the area where the character string is to be displayed wherein an omission mark is displayed in stead of part or the whole of at least one of the character string and said another character string in the second display style, wherein the character size of part or the whole of at least one of the character string and said another character string is reduced in the second display style.

11. A musical score displaying apparatus comprising:

a displayer;

a musical score display controller for retrieving musical score information from music data including the musical score information representative of a musical score and character string information representative of a character string and controlling the displayer to display the musical score based on the musical score information; and a character string display controller for retrieving character string information from the music data, controlling the displayer to display a character string represented by the retrieved character string information in associated relation with the displayed musical score when there is enough space to display the character string on the displayer, and controlling the displayer to display an omission mark instead of part or the whole of at least one of the character string, a preceding character string and a subsequent character string when there is not enough space to display the character string on the displayer.

12. A musical score displaying apparatus comprising:

a displayer;

a musical score display controller for retrieving musical score information from music data including the musical score information representative of a musical score and character string information representative of a character string and controlling the displayer to display the musical score based on the musical score information; and a character string display controller for retrieving character string information from the music data, controlling the displayer to display a character string represented by the retrieved character string information in associated relation with the displayed musical score when there is enough lateral space to display the character string on the displayer, and controlling the displayer to display at least one of the character string, a preceding character string and a subsequent character string in a plurality of rows when there is not enough lateral space to display the character string on the displayer.

13. A musical score displaying apparatus comprising:

a displayer;

a musical score display controller for retrieving musical score information from music data including the musical score information representative of a musical score and character string information representative of a character string and controlling the displayer to display the musical score based on the musical score information; and a character string display controller for retrieving character string information from the music data, controlling the displayer to display a character string represented by the retrieved character string information in a first character size and in associated relation with the displayed musical score when there is enough space to display the character string on the displayer, and controlling the displayer to display part or the whole of at least one of the character string, a preceding character string and a subsequent character string in a second character size smaller than the first character size when there is not enough space to display the character string on the displayer.

14. A computer-readable medium storing a computer program for displaying a musical score, the computer program comprising:

a musical score display controlling instruction for retrieving musical score information from music data including the musical score information representative of a musical score and character string information representative of a character string and controlling a displayer to display the musical score based on the musical score information; and a character string display controlling instruction for retrieving character string information from the music data, controlling the displayer to display a character string represented by the retrieved character string information in associated relation with the displayed musical score in a first display style in a predetermined character string display space when the character string display space has enough space to display the character string on the displayer, and controlling the displayer to display the character string or another character string in a second display style different from the first display style in the predetermined character string display space so as to prevent the character string and said another character string from overlapping each other when the predetermined character string display space does not have enough space to display the character string on the displayer, said another character string being a preceding character string or a subsequent character string.

15. A computer program for displaying a musical score, the computer program comprising:

a musical score display controlling instruction for retrieving musical score information from music data including the musical score information representative of a musical score and character string information representative of a character string and controlling a displayer to display the musical score based on the musical score information;

a determining instruction for retrieving character string information from the music data and determining whether another character string has been displayed in a predetermined area where a character string represented by the retrieved character string information is to be displayed; and a character string display controlling instruction for controlling the displayer to display the character string in associated relation with the displayed musical score in a first display style in the predetermined area when it is not determined by the determining step that said another character string has been displayed in the predetermined area where the character string is to be displayed, and controlling the displayer to display the character string or said another character string in a second display style different from the first display style in the predetermined area so as to prevent the character string and said another character string from overlapping each other when it is determined by the determining step that said another character string has been displayed in the predetermined area where the character string is to be displayed.

16. A computer program for displaying a musical score, the computer program comprising:

a musical score display controlling instruction for retrieving musical score information from music data including the musical score information representative of a musical score and character string information representative of a character string and controlling a displayer to display the musical score based on the musical score information; and a character string display controlling instruction for retrieving character string information from the music data, controlling the displayer to display a character string represented by the retrieved character string information in associated relation with the displayed musical score when there is enough space to display the character string on the displayer, and controlling the displayer to display an omission mark instead of part or the whole of at least one of the character string, a preceding character string and a subsequent character string when there is not enough space to display the character string on the displayer.

17. A computer program for displaying a musical score, the computer program comprising:

a musical score display controlling instruction for retrieving musical score information from music data including the musical score information representative of a musical score and character string information representative of a character string and controlling the displayer to display the musical score based on the musical score information; and a character string display controlling instruction for retrieving character string information from the music data, controlling the displayer to display a character string represented by the retrieved character string information in associated relation with the displayed musical score when there is enough lateral space to display the character string on the displayer, and controlling the displayer to display at least one of the character string, a preceding character string and a subsequent character string in a plurality of rows when there is not enough lateral space to display the character string on the displayer.

18. A computer program for displaying a musical score, the computer program comprising:

a musical score display controlling instruction for retrieving musical score information from music data including the musical score information representative of a musical score and character string information representative of a character string and controlling a displayer to display the musical score based on the musical score information; and a character string display controlling step for retrieving character string information from the music data, controlling the displayer to display a character string represented by the retrieved character string information in a first character size and in associated relation with the displayed musical score when there is enough space to display the character string on the displayer, and controlling the displayer to display part or the whole of at least one of the character string, a preceding character string and a subsequent character string in a second character size smaller than the first character size when there is not enough space to display the character string on the displayer.

* * * * *